(12) United States Patent
Hartmann et al.

(10) Patent No.: US 11,958,411 B2
(45) Date of Patent: Apr. 16, 2024

(54) MOBILE SENSOR DEVICE FOR A SEMITRAILER TRAIN, ARRANGEMENT OF MOBILE SENSOR DEVICES ON A SEMITRAILER, METHOD FOR ACQUIRING INFORMATION FOR A SEMITRAILER TRAIN, CENTRAL DEVICE AND SEMITRAILER TRACTOR

(71) Applicant: SAF-HOLLAND GmbH, Bessenbach (DE)

(72) Inventors: Mark Hartmann, Sulzbach am Main (DE); Bernd Brunsch, Dreieich (DE)

(73) Assignee: SAF-HOLLAND GmbH, Bessenbach (DE)

( * ) Notice: Subject to any disclaimer, the term of this patent is extended or adjusted under 35 U.S.C. 154(b) by 930 days.

(21) Appl. No.: 16/966,173

(22) PCT Filed: Feb. 11, 2019

(86) PCT No.: PCT/EP2019/053274
§ 371 (c)(1),
(2) Date: Jul. 30, 2020

(87) PCT Pub. No.: WO2019/158468
PCT Pub. Date: Aug. 22, 2019

(65) Prior Publication Data
US 2021/0039556 A1  Feb. 11, 2021

(30) Foreign Application Priority Data
Feb. 16, 2018 (DE) .................... 10 2018 103 537.3

(51) Int. Cl.
*B60D 1/36* (2006.01)
*B60R 1/00* (2022.01)
(Continued)

(52) U.S. Cl.
CPC ............... *B60R 1/003* (2013.01); *B60D 1/36* (2013.01); *B60R 2011/0078* (2013.01);
(Continued)

(58) Field of Classification Search
CPC ..... B60D 1/36; B60D 1/62; B60R 2011/0078; B60R 2300/301
See application file for complete search history.

(56) References Cited

U.S. PATENT DOCUMENTS

| 9,889,714 B2 * | 2/2018 | Bochenek | ................ B60D 1/36 |
| 10,259,390 B2 * | 4/2019 | Zhang | ...................... B60R 1/00 |

(Continued)

FOREIGN PATENT DOCUMENTS

| DE | 102017111530 A1 | 11/2017 |
| EP | 1886905 A1 | 2/2008 |

(Continued)

OTHER PUBLICATIONS

European Patent Office; International Search Report; Entire document; dated Apr. 24, 2019.

*Primary Examiner* — Kevin Hurley
*Assistant Examiner* — Hosam Shabara
(74) *Attorney, Agent, or Firm* — Price Heneveld LLP (57) ABSTRACT

A mobile sensor device for a vehicle combination with a tractor and a trailer, in particular a semitrailer train with a semitrailer tractor and a semitrailer includes a recording device for recording information, a transmission device for transmitting the information to a central device, and a connection area for detachably coupling the mobile sensor device to the trailer, in particular the semitrailer.

15 Claims, 5 Drawing Sheets

(51) Int. Cl.
*B60R 11/00* (2006.01)
*B60R 11/04* (2006.01)

(52) U.S. Cl.
CPC ......... *B60R 11/04* (2013.01); *B60R 2300/105* (2013.01); *B60R 2300/301* (2013.01)

(56) References Cited

U.S. PATENT DOCUMENTS

| | | | |
|---|---|---|---|
| 11,014,416 B2* | 5/2021 | Dodd | ........................ B60D 1/62 |
| 2003/0103142 A1 | 6/2003 | Hitomi et al. | |
| 2006/0255560 A1 | 11/2006 | Dietz | |
| 2007/0216136 A1 | 9/2007 | Dietz | |
| 2016/0272024 A1* | 9/2016 | Bochenek | ................ B60D 1/06 |
| 2016/0381292 A1 | 12/2016 | Lu | |
| 2017/0341583 A1* | 11/2017 | Zhang | ........................ B60R 1/00 |
| 2019/0039425 A1* | 2/2019 | Dodd | ............. B60W 30/18036 |

FOREIGN PATENT DOCUMENTS

| | | |
|---|---|---|
| EP | 2042352 A1 | 4/2009 |
| EP | 2722234 B1 | 3/2016 |
| JP | 2003019984 A | 1/2003 |
| JP | 2004291751 A | 10/2004 |
| JP | 2013203174 A | 10/2013 |
| WO | 2015/074016 A1 | 5/2015 |
| WO | 2015190066 A1 | 12/2015 |
| WO | 2017/100716 A1 | 6/2017 |

\* cited by examiner

MOBILE SENSOR DEVICE FOR A SEMITRAILER TRAIN, ARRANGEMENT OF MOBILE SENSOR DEVICES ON A SEMITRAILER, METHOD FOR ACQUIRING INFORMATION FOR A SEMITRAILER TRAIN, CENTRAL DEVICE AND SEMITRAILER TRACTOR

BACKGROUND OF THE INVENTION

The present invention relates to a mobile sensor device for a semitrailer train, an arrangement of mobile sensor devices, a method of acquiring information for a semitrailer train, a central device and a semitrailer tractor.

Road trains or semitrailer trains typically consist of a semitrailer tractor or motor vehicle and a semitrailer or trailer, the semitrailer being connectable to the semitrailer tractor by means of a corresponding coupling mechanism. For proper coupling, the semitrailer tractor and the semitrailer must be aligned or manoeuvred in relation to each other and transferred to a state ready for coupling. In order to support a vehicle driver or for at least partially automated coupling, it has proven to be helpful to provide appropriate information useful for coupling, for example in the form of rear area monitoring. The mentioned rear area monitoring system makes it possible, for example, to determine the space required for manoeuvring and to take this into account when aligning the semitrailer train. For example, for rear area monitoring, areas behind the semitrailer, which are otherwise not directly visible, are recorded by means of cameras. In particular, a distance to objects that represent an obstacle when manoeuvring the semitrailer train can be sensed.

However, older semitrailers often lack recording devices to capture the relevant information, such as a camera.

It is an object of the present invention to provide information on the operating state of a semitrailer train, in particular if no recording device is integrated in the semitrailer.

SUMMARY OF THE INVENTION

According to the invention, a mobile sensor device is provided for a vehicle combination with a tractor and a trailer, in particular a semitrailer train with a semitrailer tractor and a semitrailer, comprising
  a recording device for recording information, such as, e.g., a camera,
  a transmission device for transmitting the information to a central device, and
  a connection area for detachably coupling the mobile sensor device to the semitrailer.

By means of the mobile sensor device according to the invention, it is advantageously possible to equip such semitrailers in which no recording device is integrated yet with a recording device. In particular, semitrailers can be upgraded as required. In addition, the mobile sensor device allows it to be used for a large number of semitrailer tractors. This means that several semitrailers intended for one semitrailer tractor can share one mobile sensor device. Furthermore, no recording device has to be integrated on the semitrailer, so that no corresponding installation space requirement on the semitrailer has to be taken into account. Preferably, the information is information relevant for coupling the semitrailer to the semitrailer tractor, which can be used for coupling the semitrailer to the semitrailer tractor. For example, the information includes a visual recording of a partial area in the vicinity of the semitrailer and/or the semitrailer tractor, which is recorded, for example, for rear area monitoring. In principle, the central device, for example a board computer of the semitrailer tractor, is used to collect information. It is conceivable that the central device is designed to receive and process information from several mobile sensor devices, for example by combining them. It is also conceivable that the various pieces of information could be combined by the central device and/or made available to the driver of the vehicle or a system for the automated coupling of semitrailer tractor and semitrailer. For example, the recorded information is made available via a display or screen on the central equipment. Furthermore, it is conceivable that several mobile sensor devices are provided, wherein a recording device of a mobile sensor device of a first type differs from a recording device of a mobile sensor device of a second type, for example with regard to its sensing performance (e.g. the detectable solid angle range in the case of a camera) and/or the acquired information (e.g. an image or a measured variable is recorded). For example, the mobile sensor devices of the first type and the mobile sensor devices of the second type have different visual markings, e.g. different colours for the different types. The connection area is advantageous for reversible mounting of the mobile sensor device on the semitrailer, preferably without tools or without the need for further tools. For this purpose, the connection area can be detachably coupled to the semitrailer, for example via a coupling mechanism. This connection area advantageously allows the mobile sensor device to be attached to the semitrailer as required. Preferably, the mobile sensor device can be mounted in different positions. It is also preferable that the communication between the transmission device and the central device is wireless. Preferably the communication is done via an electromagnetic signal, especially Bluetooth signal and/or a radio signal. It is also conceivable that the transmission device communicates with the central device, for example via cables already integrated in the semitrailer. Furthermore, the transmission device is configured in such a way that the recorded information is sent to the central device after a fixed or adjustable time interval. Preferably, the transmission takes place immediately in order to be able to directly use direct real-time information for coupling and to be able to react quickly to changes. It is also conceivable that the transmission device transmits only a selected part and/or a pre-processed part of the information. It is also conceivable that the transmission device is part of a line which is electrically connected to the semitrailer tractor for data transmission. Preferably, already existing lines in the semitrailer are used to transmit the information. A further advantage of the mobile sensor device is that the mobile sensor device can be detached again, for example after coupling. As a result, the recording device or the sensor device cannot contribute to air resistance when the semitrailer is moving.

Expediently, the sensor device can be connected non-positively and/or positively to the trailer or semitrailer via the connection area. This allows the mobile sensor device to be securely fixed to the semitrailer, taking into account the expected circumstances. Preferably, a coupling mechanism is provided which is configured in such a way that the mobile sensor device can be mounted on the semitrailer without tools. This allows the mobile sensor device to be quickly and easily attached to the semitrailer. It is also conceivable that the coupling mechanism comprises a semitrailer-side component and a sensor-side component. This allows the semitrailer-side component to be mounted in a fixed position. If the sensor device is mounted at a later date, it can thus be mounted in a fixed and reproducible place. For example, the component on the semitrailer side comprises a rail with undercuts or a dovetail guide into which the sensor component is pushed, preferably until it locks into place.

For example, the connection area includes a quick release, a magnet and/or a suction cup. This advantageously allows to mount the mobile sensor device quickly and easily on the semitrailer. When using a magnet and/or suction cup, it is advantageously possible to mount the mobile sensor device in any position, as far as it is suitable.

Preferably the recording device includes a camera, a force sensor, an inclination sensor, a LIDAR sensor and/or a RADAR sensor. The camera can be advantageously used for rear area monitoring of at least a part of the area surrounding the semitrailer. The force sensor can, for example, be used to determine the loading status of the semitrailer. This can advantageously also be taken into account for manoeuvring or coupling. With the inclination sensor it is advantageously possible to determine whether a longitudinal axis of the semitrailer runs parallel to the roadway or is inclined to it. A sensor for monitoring a support element is also provided. The LIDAR sensor and/or the RADAR sensor can be used to sense obstacles in the vicinity of the semitrailer train. It is also conceivable that each sensor device comprises several different recording devices. It is also conceivable that only one of the recording devices—depending on its position on the semitrailer—sends information via the transmission device. This allows the mobile sensor device to be placed universally at different positions. For example, the desired recording device can be activated by a switch. It is also conceivable that the mobile sensor device automatically detects its position on the semitrailer and automatically selects the appropriate recording device.

Expediently, it is provided that the recording device is pivotable and/or movable in relation to the connection area. This allows the recording device to be aligned accordingly for fine adjustment after mounting the mobile sensor device. For example, the connection area includes a joint, especially a ball joint. This allows, for example, the camera to be specifically aligned to a partial area in the vicinity of the semitrailer. Preferably, the mobile sensor device includes a drive unit, such as an electric motor, with which the camera can be aligned remotely.

Preferably, the central unit is integrated into the tractor or semitrailer tractor, in particular a board computer of the semitrailer tractor or an external control centre. For example, the central device is provided in a board computer in the driver's cab of the semitrailer tractor. This means that coupling can advantageously be monitored in the driver's cab. For example, the information collected and combined in the central device is visualised on a screen. This allows a driver to intervene if necessary if he detects a problem. It is also conceivable that the coupling is coordinated by an external control centre. A computer, a smartphone and/or a tablet could be used as an external control centre. This allows the coupling to be monitored without the driver's cab having to be occupied. In particular, the transmission device is designed to depend on the position of the central device. If the central device is integrated in the driver's cab, comparatively low transmission power is required for the transmission of information, while higher transmission power is required when using external central devices.

In particular, the connection area is designed independent of the semitrailer. This allows the mobile sensor device to be used for several types of semitrailers. Accordingly, it is sufficient if the mobile sensor device is carried in the semitrailer tractor and can be mounted independently of the type of semitrailer. It is therefore advantageously not necessary to provide a suitable mobile sensor device for each semitrailer.

Expediently, the mobile sensor device can be attached to an outer wall of the semitrailer or trailer. Thus, it is advantageously not necessary to keep free or modify a corresponding installation space for the necessary recording devices in the semitrailer. Preferably, the recording device and/or the connection area should be designed to be weatherproof, for example in an appropriate housing or stored protected from rain. It is also conceivable to use a cover, preferably transparent, which protects the mobile sensor device when mounted. The mobile sensor device is preferably designed for mounting on a side wall, underbody or roof wall of the semitrailer.

In particular, it is intended that the mobile sensor device has a housing, in particular an at least partially transparent housing, which is aerodynamically designed so that the sensor device mounted on the semitrailer train only slightly affects the wind resistance of the semitrailer train. For example, the housing has a pot-bellied end and a pointedly converging end, whereby the housing can be aligned in such a way that the housing has a reduced aerodynamic resistance, compared to attaching the mobile sensor device to the articulated vehicle alone, without a housing.

A further aspect of the present invention relates to an arrangement of mobile sensor devices, in particular of the sensor devices described above, on a semitrailer or trailer, wherein the mobile sensor devices are arranged and/or aligned in such a way that, on the basis of the information acquired by the sensor devices, in particular by the recording device of the mobile sensor devices     a relative orientation between the semitrailer tractor or tractor and the semitrailer or trailer, in particular in a coupled and uncoupled state, and/or     a readiness to couple of the semitrailer or trailer     can be determined. For example, the mobile sensor devices are mounted on the semitrailer in such a way that, for example, sub-areas covered by cameras overlap at least in some areas, so that the combined sub-areas can provide a kind of panoramic view. Preferably the mobile sensor devices of the same type are arranged at the same height, i.e. at the same distance from the roadway. It is also conceivable that the mobile sensor devices could each be mounted on areas of the semitrailer which have been made recognisable by visual markings. This is an advantage in facilitating the correct arrangement of the mobile sensor devices. It is also conceivable that the mobile sensor devices could communicate with each other, for example by means of the transmission device, in particular by exchanging information about their relative position. It would be conceivable, for example, that the mobile sensor device indicates that its distance to the next mobile sensor device is too small or too large. Furthermore, it is preferably provided that the transmission devices of the mobile sensor devices are synchronized with one another or coordinated with one another, so that the central device can, for example, distinguish or assign the origin of the individual pieces of information. All features described for the mobile sensor device according to the invention and its advantages can also be transferred to the arrangement according to the invention and vice versa.

Preferably, the mobile sensor device is arranged at a distance of more than one meter above a roadway. For example, in an area between 1.5 m and 2 m above the roadway. This arrangement not only allows easy installation, as the user does not have to bend down, but also allows a comparatively large solid angle to be detected. It is particularly preferred that the sensor device is not mounted on a trailer coupling or a drawbar. It is also intended that several sensor devices are arranged in such a way that the spatial areas of the several sensor devices overlap. Preferably, the acquired information or images can then be combined to form an overall image. The overall image can then be evaluated.

Preferably a front mobile sensor device in a front section of the semitrailer or trailer and two lateral mobile sensor devices are provided, which are arranged offset relative to one another in a transverse direction, wherein the lateral mobile sensor are arranged behind the front mobile sensor device as viewed in the direction of travel, wherein preferably the front mobile sensor device and the lateral mobile sensor devices are arranged in an interface portion between the semitrailer tractor or tractor and the semitrailer or trailer, in particular on an underside of the semitrailer. Preferably, the front mobile sensor device and the lateral mobile sensor devices are designed or arranged to sense a distance or a change in distance to the mobile semitrailer tractor. This makes it advantageously possible to determine a relative orientation of the semitrailer tractor to the semitrailer, in particular when coupled, for example when a change in direction of travel (to the right or left) occurs or when the semitrailer tractor tilts relative to a central plane of the semitrailer.

Preferably a rear mobile sensor device in a front region of the semitrailer or trailer and two lateral mobile sensor devices are provided, which are arranged offset relative to one another in a transverse direction, wherein the lateral mobile sensor devices are arranged in front of the rear mobile sensor device as viewed in the direction of travel, wherein preferably the rear mobile sensor device and the lateral mobile sensor devices are arranged in an interface region between the semitrailer tractor or tractor and the semitrailer or trailer, in particular on an underside of the semitrailer. The rear mobile sensor device can thus be arranged in an advantageous manner more protected than the rear mobile sensor device. The rear mobile sensor device and the lateral mobile sensor devices are preferably designed or arranged to sense a distance or a change in distance to the mobile semitrailer tractor. This makes it advantageously possible to determine a relative orientation of the semitrailer tractor to the semitrailer, in particular when coupled, for example when a change of direction (to the right or left) occurs or when the semitrailer tractor tilts relative to a central plane of the semitrailer.

It is also conceivable that a fixed sensor device is provided in addition to a mobile sensor device. In contrast to the mobile sensor devices, the fixed sensor device cannot be detached from the semitrailer tractor. Preferably, the fixed sensor device includes another transmission device and collects the information from the mobile sensor devices in order to forward it. Preferably the mobile sensor units are positioned relative to the fixed sensor unit. Furthermore, it is conceivable that the mobile sensor devices are controlled by the fixed sensor device or are automatically aligned after their installation in order to take up a desired or optimal space in the rear area of the semitrailer train.

It is expedient to provide a common transmission device for several recording devices. For example, several recording devices can be connected by means of a common transmission device, which in turn transmits the information to the central device. The transmission device may be independent of the mobile sensor devices or integrated into one of the mobile sensor devices. This eliminates the need to integrate a transmission device into each mobile sensor device.

A further object of the present invention is a central device for evaluating information provided by a mobile sensor device, in particular the sensor device described above, wherein the central device, preferably a processor of the central device, is configured in such a way that by means of the provided information
- a relative orientation between the tractor and the semitrailer or trailer, in particular in a coupled and/or uncoupled state, and/or
- a readiness to couple can be determined. All features described for the mobile sensor device or arrangement according to the invention and their advantages can also be transferred to the central device according to the invention and vice versa. Preferably, the central device is designed in such a way that it collects and assembles the information. In this way, the information collected in the central device can be used to support or automate the coupling.

A further aspect of the present invention is a method for acquiring information for a semitrailer train or a vehicle combination with a semitrailer tractor and a semitrailer, comprising:
- detachably arranging a mobile sensor device on a semitrailer,
- acquiring the information by means of a recording device within the mobile sensor device, and
- transmitting the information to a central device by means of a transmission device. All features described for the mobile sensor device, arrangement or central device according to the invention and their advantages can also be analogously transferred to the central device according to the invention and vice versa. Preferably, the central device is designed in such a way that it collects and combines the information.

Expediently a position of the mobile sensor device is checked by means of the information transmitted to the central device. This is an advantage in ensuring that the mobile sensor devices are mounted in their intended location to provide useful information to the central device. For example, triangulation is used to determine the position of the individual mobile sensor devices, thus ensuring that they are positioned in the correct position on the semitrailer.

A further aspect of the present invention is an semitrailer tractor or tractor, such as a motor vehicle, wherein the semitrailer tractor or tractor has a stowage area for a mobile sensor device for a semitrailer train, wherein the mobile sensor device has a recording device for acquiring an item of information, a transmission device for the transmission of the information, in particular wireless transmission, to a central device, and a connection area for coupling the mobile sensor device to a semitrailer. All features and their advantages described for the mobile sensor device, arrangement, central device and the method in accordance with the invention can also be transferred analogously to the semitrailer tractor in accordance with the invention and vice versa. In the stowage area, the mobile sensor devices can be stowed safely if they are not mounted on the semitrailer.

It is expedient that the stowage area is designed in such a way that a signal is transmitted to the central device if the mobile sensor device is missing. This can ensure that the semitrailer tractor always carries one or more mobile sensor devices, so that the corresponding semitrailer to be coupled can be equipped with the mobile sensor devices at any time.

BRIEF DESCRIPTION OF THE DRAWINGS

Further advantages and features result from the following description of preferred embodiments of the subject matter of the invention with reference to the attached figures. Individual features of the individual embodiments can be combined with each other within the scope of the invention.

In the figures is shown.

DETAILED DESCRIPTION OF THE PREFERRED EMBODIMENTS

Figure 1:
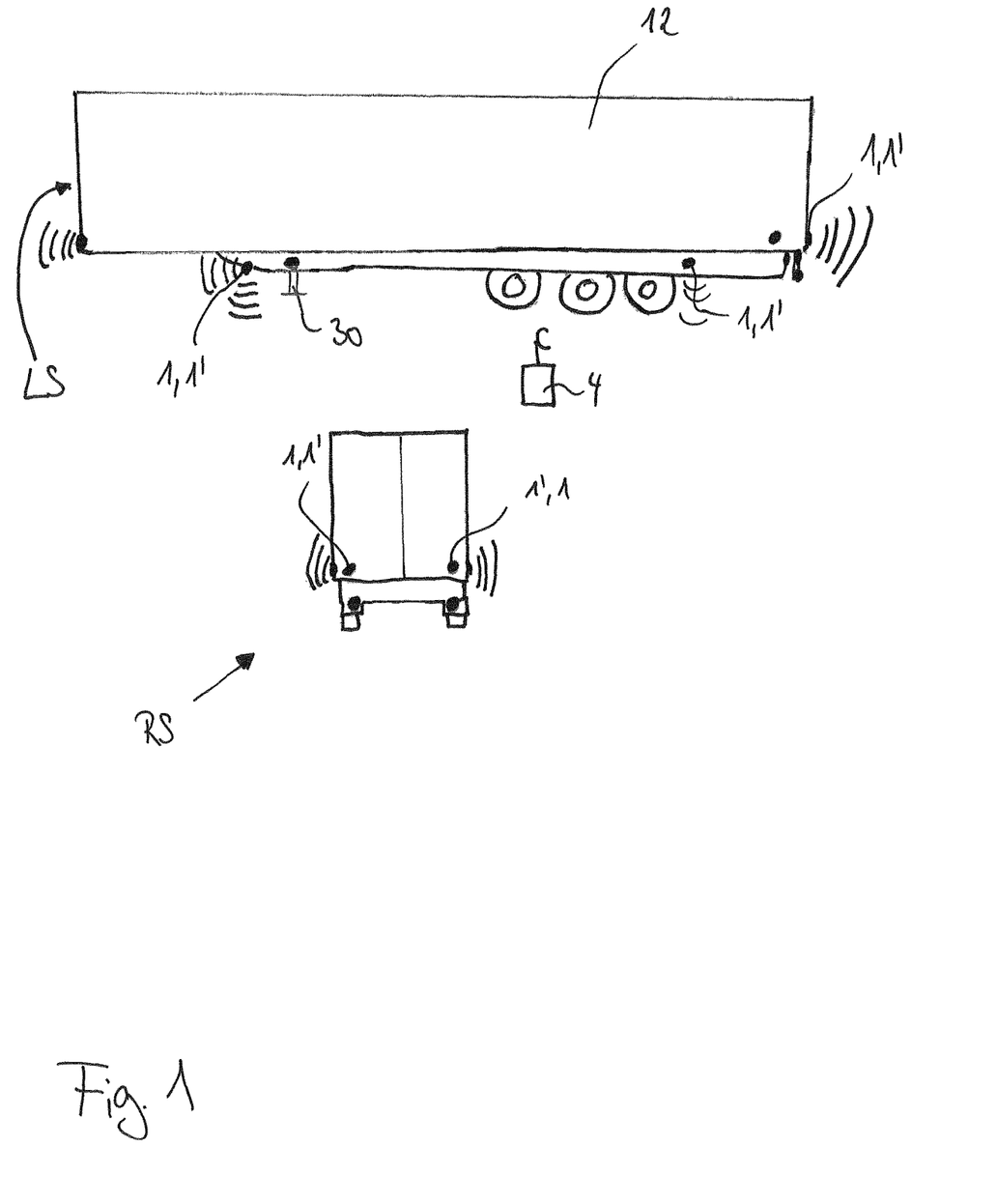
FIG. 1 illustrates a semitrailer with a mobile sensor device according to a first exemplary embodiment of the present invention.

FIG. 1 schematically shows a semitrailer 12 with a mobile sensor device 1 according to a first exemplary embodiment of the present invention in two different side views. In particular, a rear side RS and a long side LS of the semitrailer 12 are illustrated. Preferably it is a semitrailer 12 which, together with a semitrailer tractor 11, forms a semitrailer train 10, whereby the connection of the semitrailer 12 to the semitrailer tractor 11 is to be at least partially, preferably completely, automated. For connecting or coupling, the semitrailer 12 and the semitrailer tractor 11 must be aligned or maneuvered in relation to one another. In addition to the alignment of the semitrailer tractor 11 and the semitrailer 12, further information, such as the inclination or height of the semitrailer 12, is preferably useful for clarifying whether the semitrailer train 10 is ready to be coupled. Accordingly, a great deal of information must be provided and processed for successful automatic manoeuvring of the semitrailer 12, which finally ends in a coupling of the semitrailer 12 to the semitrailer tractor 11.

A mobile sensor device 1 is provided in order to enable automatic manoeuvring or coupling of the semitrailer 12 to the semitrailer tractor 11 even for those semitrailers 12 which are not equipped with a recording device 2 for acquiring information from the start. A component part of the mobile sensor device 1 is a recording device 2 for sensing information and a transmission device 3 for communication with a central device 4. By means of the transmission device 3 it is advantageously possible to transmit the acquired information to the central device 4, preferably to collect it and, possibly to evaluate the collected information or to combine it into an overall picture. The transmission is preferably wireless, for example via a radio or Bluetooth connection. Information can be understood as, for example, an image recording, a measured variable and/or a change in a measured variable. Furthermore, it is intended that the mobile sensor device 1 is configured in such a way that information is transmitted directly to the central device 4, for example within a fixed time window. Accordingly, the information provided to the central device 4 is comparatively up-to-date and can be used for manoeuvring the semitrailer 12. The preferred option is for the central device 4 to be integrated in the semitrailer tractor 11, for example in a board computer, or in an external control centre. The external control unit can in turn be integrated into a smartphone, tablet or computer, for example.

Figure 5:
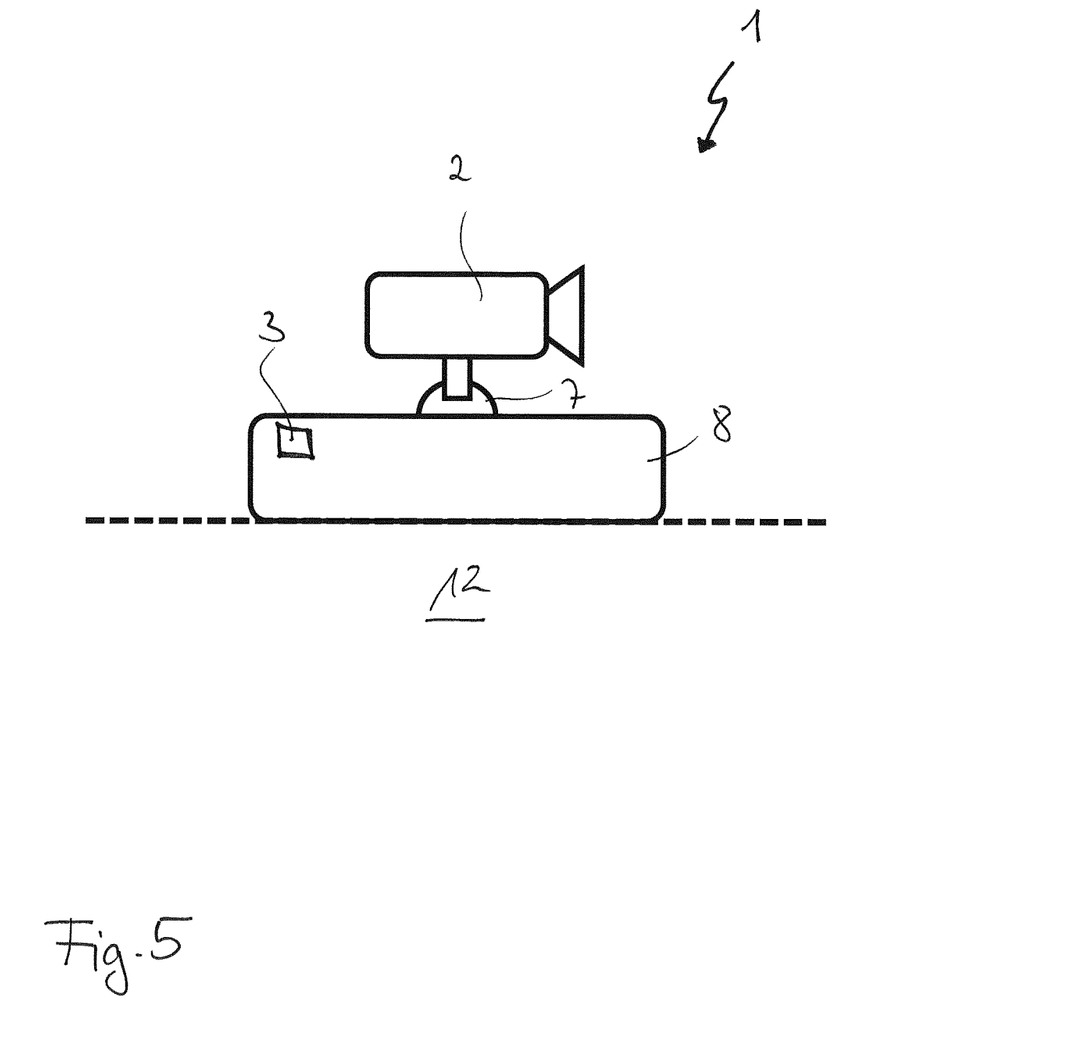
FIG. 5 illustrates a mobile sensor device according to a third embodiment of the present invention.

FIG. 5 shows schematically and exemplary a mobile sensor device 1. This mobile sensor device 1 includes a connection area 8 for connection to the semitrailer 12. Preferably, the connection area 8 is designed independently of the semitrailer. For example, the connection area 8 comprises a magnet and/or a suction cup with which the mobile sensor device 1 can be connected to different types of semitrailers 12. By means of a joint 7 the recording device 2 can be aligned for fine adjustment preferably after connecting it to the semitrailer 12.

Several mobile sensor devices 1 are provided for the semitrailer 12 shown in FIG. 1, in particular mobile sensor devices V of a first type and mobile sensor device 1" of a second type. For example, the mobile sensor devices V of the first type serve to monitor the rear area and therefore include a camera as recording device 2. The mobile sensor devices 1 can preferably be mounted on the outside of the semitrailer 11, preferably at the same height, i.e. at the same distance from the road. The mobile sensor devices of the second type 1" serve, for example, to monitor the height or inclination of the semitrailer 12 to the roadway FB or to a centre plane M1. In order to diagnose a positive coupling readiness, for example, a coupling element on the semitrailer side must have a corresponding height that allows coupling to a complementarily designed further coupling element on the semitrailer tractor 11. For example, the mobile sensor device 1" of the second type monitors an extendable support element 30, in particular its state of extension.

Figure 2:
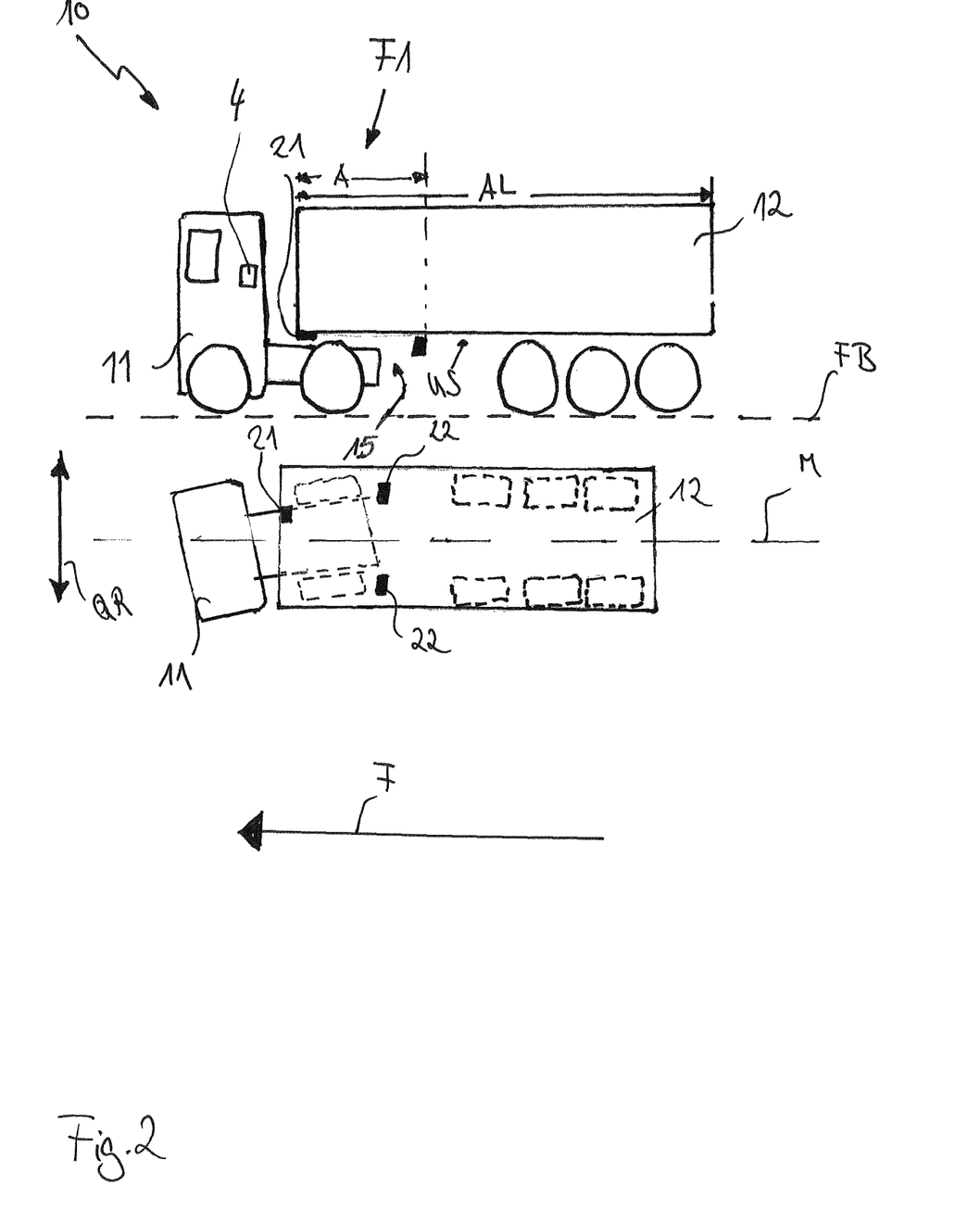
FIG. 2 illustrates a semitrailer train with a mobile sensor device according to a second exemplary embodiment of the present invention.

FIG. 2 shows a semitrailer train 10 with a mobile sensor device 1 according to a second exemplary embodiment of the present invention. For the illustrated embodiment it is intended that the mobile sensor devices 1 are used in a coupled state of the semitrailer train 10 to determine the orientation of the semitrailer 12 with respect to the semitrailer tractor 11. Preferably, three mobile sensor devices 1 are provided here, which are arranged in a front third of the semitrailer 12 as seen in the direction of travel F. In particular, the mobile sensor devices 1 are arranged on the semitrailer 12, for example on its underside US facing the roadway FB, in such a way that they each sense a distance to the coupled semitrailer tractor. In particular, a front mobile sensor device 21 is arranged in a front section F1 of the semitrailer 12, in particular at the height of an end face of the semitrailer 12 facing the semitrailer tractor 11 in the coupled state, while two lateral mobile sensor devices 22 are arranged behind the front mobile sensor device 21, viewed in the direction of travel F. In particular, it is provided that a distance A, measured in the direction of travel F, between the front mobile sensor device 21 and the lateral mobile sensor devices 22 assumes a value between 0.1 and 0.5, preferably between 0.2 and 0.4 and more preferably between 0.23 and 0.29, in relation to a total length AL of the semitrailer 12 measured in the longitudinal direction. Furthermore, it is preferably provided that the lateral mobile sensor devices 22 are in each case arranged on opposite sides of the semitrailer 12, as viewed in the transverse direction QR, preferably at the same height as viewed in the direction of travel F. With this arrangement it is possible, for example, to determine whether the semitrailer tractor 11 is inclined to the right or to the left in relation to a longitudinal axis M of the semitrailer 12 (for example for a corresponding drive to the right or to the left).

For example, if the front mobile sensor device 21 does not sense a change in distance from the semitrailer tractor 11 (marked 0 in FIG. 2), the central device 4 can use the information transmitted to determine that the semitrailer tractor 11 has rotated relative to the longitudinal axis M, while the distance increases for one lateral mobile sensor device 22 (marked with a +) and decreases for the other lateral sensor device 22 (marked with a −).

Figure 3A:
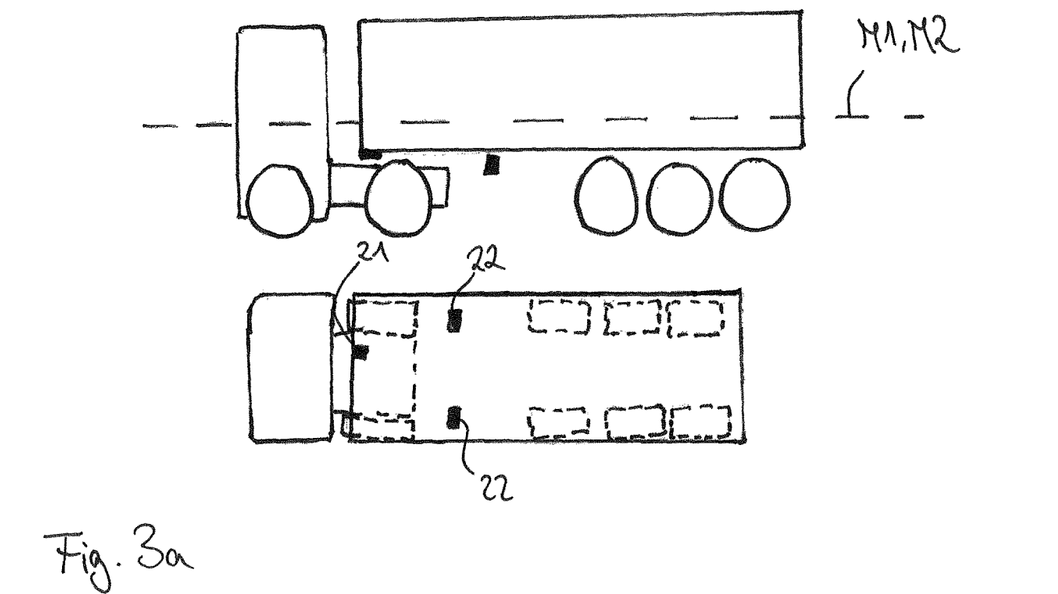
FIGS. 3a and 3b illustrate a semitrailer train with a mobile sensor device according to a second exemplary embodiment of the present invention.
Figure 3B:
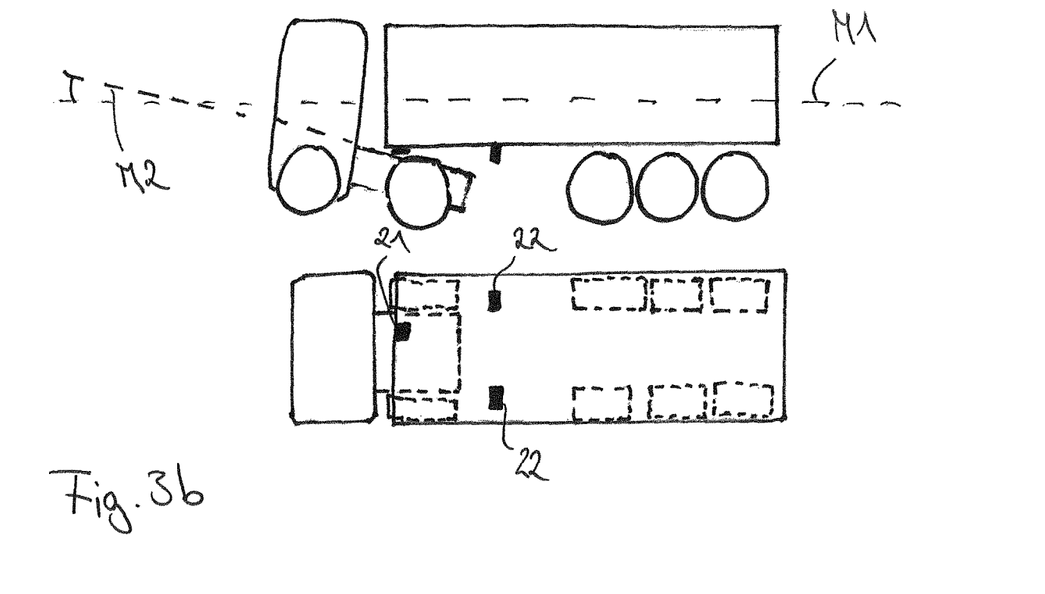

In FIGS. 3a and 3b, the lateral mobile sensor device 22 and the front mobile sensor device 21 are used to determine an upward and downward inclination of the semitrailer tractor with respect to a centre plane M1 of the semitrailer 12. In particular, FIG. 3b shows a situation in which the semitrailer tractor is tilted upwards with its front side, as seen in the direction of travel F, and as a result a distance sensed by the front mobile sensor device 1 decreases (characterized with −), whereas in FIG. 3a a centre plane M2 of the semitrailer tractor is substantially parallel to the centre plane M1 of the semitrailer 12, i.e. the semitrailer tractor 11 is not tilted.

Figure 4:
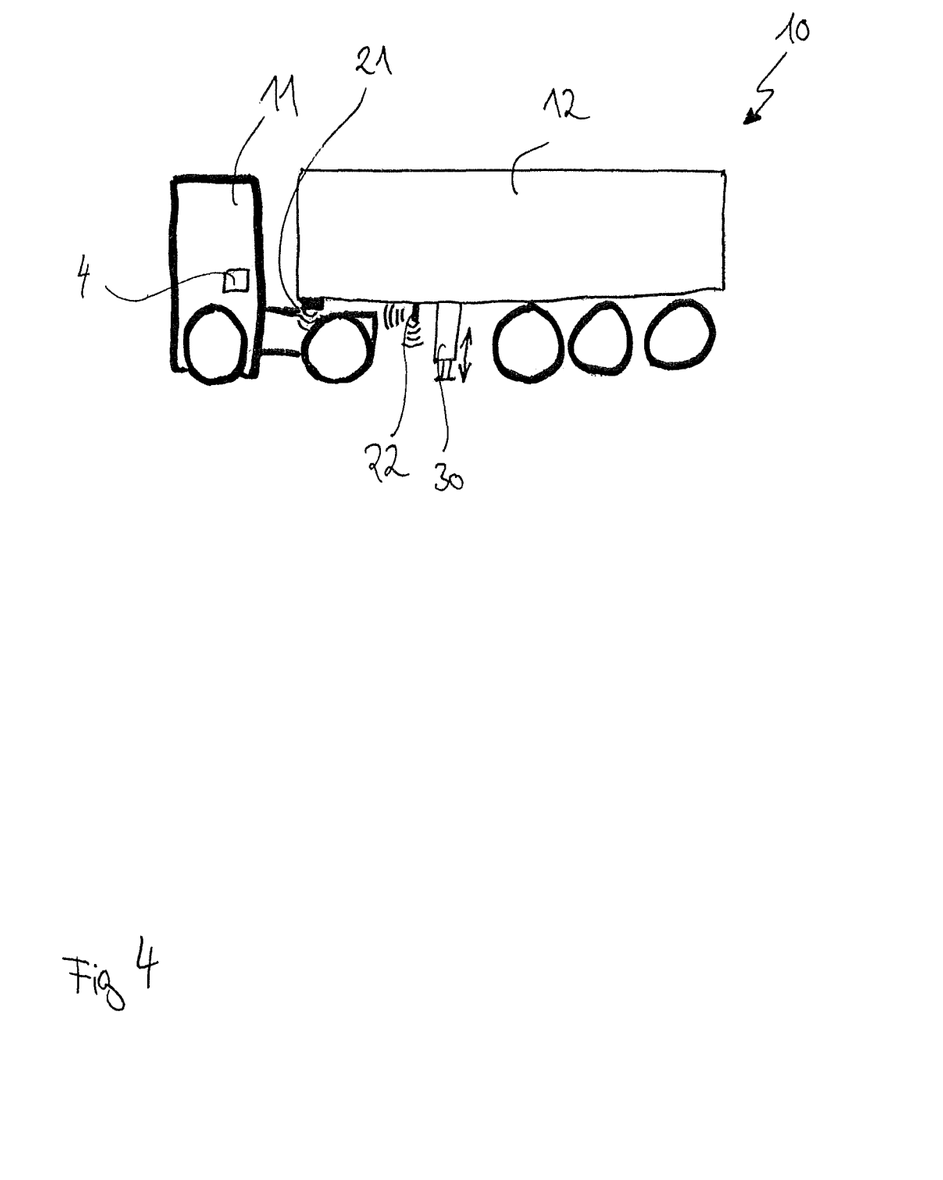
FIG. 4 illustrates a semitrailer train with a mobile sensor device according to a second exemplary embodiment of the present invention.

FIG. 4 illustrates how the front mobile sensor device 21 and/or the lateral mobile sensor devices 22 are used to monitor the coupling of the semitrailer 12 to the semitrailer tractor 11. For example, the lateral mobile sensor device 22 is used to determine how far a support element 30 has extended. The lateral mobile sensor device 22 is preferably located in the area of the support element 30, preferably directly in front of it, seen in the direction of travel F.

LIST OF REFERENCE SIGNS 1 mobile sensor device
1' mobile sensor device of a first type
1" mobile sensor device of a second type
2 recording area
3 transmission device
4 central device
8 connection area
10 semitrailer train
11 semitrailer tractor
12 semitrailer
21 front mobile sensor device
22 lateral sensor device
30 support element
F direction of travel
M longitudinal axis
M1 centre plane of the semitrailer
M2 centre plane of the semitrailer tractor
A distance
AL total length
QR transverse direction
RS rear side
LS long side
FB roadway
US underside
F1 front section

The invention claimed is:

1. A mobile sensor device for a semitrailer train with a semitrailer tractor and a semitrailer, comprising:
 a recording device for recording information;
 a transmission device for transmitting the information to a central device; and
 a connection area for detachably coupling the mobile sensor device to the semitrailer;
 wherein already existing lines integrated in the semitrailer are used to transmit the information;
 wherein the mobile sensor device together with the transmission device is coupled to the semitrailer; and
 wherein the transmission device is configured to communicate with the central device via cables already integrated in the semitrailer.

2. The mobile sensor device according to claim 1, wherein the sensor device is configured to be connected non-positively the semitrailer via the connection area.

3. The mobile sensor device according to claim 1, wherein the sensor device is configured to be connected positively to the semitrailer via the connection area.

4. The mobile sensor device according to claim 1, wherein the connection area includes a quick release, a magnet and/or a suction cup.

5. The mobile sensor device according to claim 1, wherein the recording device includes a camera, a force sensor, an inclination sensor, a LIDAR sensor and/or a RADAR sensor.

6. The mobile sensor device according to claim 1, wherein the recording device is pivotable and/or displaceable relative to the connection area.

7. The mobile sensor device according to claim 1, wherein the central device is integrated into the semitrailer tractor.

8. The mobile sensor device according to claim 7, wherein the central device is integrated into a board computer of the semitrailer tractor, or an external control center.

9. The mobile sensor device according to claim 1, wherein the connection area is independent of the semitrailer.

10. The mobile sensor device according to claim 1, wherein the mobile sensor device is configured to be attached to an outer wall of the semitrailer.

11. An arrangement of mobile sensor devices on a semitrailer, wherein the mobile sensor devices are arranged and/or aligned such that, on a basis of the information acquired by a their recording device of the arrangement of mobile sensor devices, a relative orientation between the tractor and the trailer in a coupled and/or uncoupled state, and/or a readiness to couple of the trailer can be determined, wherein already existing lines integrated in the semitrailer are used to transmit the information; and
 wherein a front mobile sensor device of the mobile sensor devices is located in a front section of the semitrailer and two lateral mobile sensor devices of the mobile sensor devices are arranged offset relative to one another in a transverse direction, wherein the lateral mobile sensor devices are arranged behind the front mobile sensor device as viewed in a forward direction of travel, and wherein the front mobile sensor device and the lateral mobile sensor devices are arranged in an interface portion between a semitrailer tractor and the semitrailer on an underside of the semitrailer.

12. The arrangement of mobile sensor devices according to claim 11, wherein a common transmission device is provided for several recording devices.

13. A central device for evaluating information provided by a mobile sensor device, wherein the central device is configured such that by the provided information a relative orientation between a semitrailer tractor and the semitrailer in a coupled and/or uncoupled state, and/or a readiness to couple can be determined, wherein already existing lines integrated in the semitrailer are used to transmit the information between a transmission device of the mobile sensor device and the central device where the mobile sensor device is configured to be detachable mounted to the semitrailer.

14. A method for acquiring information for a semitrailer tractor and a semitrailer, comprising:

detachably arranging a mobile sensor device on the semitrailer where the mobile sensor device includes a transmission device;

acquiring information via a recording device of the mobile sensor device; and transmitting the information to a central device via a transmission device;

wherein already existing lines integrated in the semitrailer are used to transmit the information.

15. The method according to claim 14, wherein a position of the mobile sensor device is via the information transmitted to the central device.

\* \* \* \* \*

UNITED STATES PATENT AND TRADEMARK OFFICE
CERTIFICATE OF CORRECTION

PATENT NO. : 11,958,411 B2  
APPLICATION NO. : 16/966173  
DATED : April 16, 2024  
INVENTOR(S) : Mark Hartmann et al.

Page 1 of 1

It is certified that error appears in the above-identified patent and that said Letters Patent is hereby corrected as shown below:

In the Specification

Column 4, Line 66:
"roadway. For" should be — roadway, for —

Column 5, Line 42:
"rear" ($1^{st}$ occurrence) should be — lateral —

Column 6, Line 47:
"an" should be — a —

Column 7, Line 37:
"maneuvered" should be — manoeuvered —

Column 8, Line 5:
"exemplary" should be — exemplarily —

Column 8, Lines 17, 18:
"V" should be — 1' —

In the Claims

Column 10, Claim 2, Lines 7-8:
After "non-positively" insert -- to --

Signed and Sealed this  
Twenty-fourth Day of September, 2024

Katherine Kelly Vidal  
*Director of the United States Patent and Trademark Office*